Patented Aug. 11, 1931

1,818,782

UNITED STATES PATENT OFFICE

STEFAN BAKONYI, OF DESSAU, GERMANY

METHOD OF PRODUCING BUTANOL AND ACETONE BY FERMENTATION

No Drawing. Application filed December 21, 1928, Serial No. 327,751, and in Germany October 22, 1928.

For the purposes of producing butanol and acetone from saccharine or amylaceous raw materials by fermentation there has already been proposed and used a great number of bacteria, for instance, *Bacillus butylicus* Fitz (German Patent No. 323,533), *Bacillus* Weizmann (British Patent No. 4845/1915), *bacillus butylicus* Boinot-Firmin (U. S. Patent No. 1,385,888), *Bacillus aceto-butylicum* (U. S. Patent No. 1,427,595), *Bacillus butylaceticum* (U. S. Patent No. 1,537,597), *Clostridium butyricum* Prazmowski-Pike-Smyth (U. S. Patent No. 1,655,435) and numerous bacteria of the amylobacter group (British Patent No. 164,023).

Now I have succeeded in finding a group of bacteria, which sharply differ from all the above-named or elsewhere described species as well by their morphological character as by their biochemical properties, especially in view of their fermenting power, which renders them more operative in the production of butanol and acetone than other species. The characteristics of this group of bacteria hereinafter designated as "butylobacter" group will be set forth in the following specification.

The bacteria of the butylobacter group form vegetative cells, 2–3 microns in length and ¼–⅓ micron in diameter. The bacteria lying in pairs form an obtuse angle, resembling to *Myxobacterium tuberculosis*. Contrary to all other above named species these cells form under ordinary conditions neither chains nor filaments. An important feature is the gramcoloring: if, for instance, a corn mash of 5% is inoculated with spores, the young cells are at first grampositive (blue). After 24 hours however they get a red-violet color and become red more and more every hour, they are sharply red (gramnegative) 42 hours later. This color is retained during 1–3 hours, then they assume again the red-violet color. Finally, after 48 hours, they become anew grampositive (blue).

The formation of spores takes place after 24 hours. The spores lie eccentrically and form a cylindric figure about 1 micron in length and ½–⅔ micron in diameter.

The fermenting power in concentrated mashs is rather characteristic. The species of bacteria hitherto described are enabled to ferment a 5 to 8% mash with a yield of ⅓ of the starch employed and this gives a yield increased by 40–43% at a doubled concentration. This double concentration saves in the production of butanol and acetone by fermentation with butylobacter a good half of steam and power consumption. Considering the greatly increased yield the use of butylobacter is twofold economical.

An other important feature of the butylobacter group is the ability of its members to accomodate themselves to the actual raw material to be fermented. For instance, a species grown on maize (butylobacter zeae Bakonyi) forms a plenty of spores after having been transferred 4 or 5 times to concentrated potato soup in intervals of 24 hours each time. The fermenting power then is as good as in corn mashs. But also in raw materials, which can be fermented only with difficulty, as for instance in a diluted cane sugar molasses (blackstrap) they show without nutrient additions after being 4 times transferred in intervals of 24 hours each time a strong fermentation and copious formation of spores.

The preparation of the butylobacter may be carried out somewhat according to the following method, whereto the usual principles of bacteriological technical science may be applied. As the butylobacter is not found everywhere the method of Bakonyi for preparing the microorganisms (U. S. application 224,285, British Patent 293,015) may be advantageously employed, which by the constant presence of a minimum amount of 1–2% of butanol prevents the growth of all microorganisms, which are less resistant to butanol. The preparation of culture may be carried out by selecting a natural mixed culture and attaching the same to a solid substrata which is subject to change by the action of the biochemical agents such as particles of grain. The substrata should be freely movable in a suitable solution. A culture thus is formed. Effective inciters may be obtained by systematic selection, viz by first adding to the culture to be employed and the nutrient substrata small quantities of the butanol and acetone to be produced. Automatic selection thus takes place. The bacteria which are non-resistant to butanol and acetone are eliminated while the resistant bacteria survive. After suitable development of the bacteria a further selection under the microscope is desirable. By preparation of a number of separate samples and suitable selection of the best of those samples the strongly degenerated (granulated or deformed) individuals are eliminated and the microorganisms which show uniform protoplasm and normal shape are chosen for further development. A further microscopic investigation of the samples using fixed and colored preparations is desirable. The samples to be finally employed are those in which the microorganisms show good formation of culture and fixation to the solid nutrient substrata. A sterilized nutrient substrata to which about 1% of butanol and acetone is added is inoculated with these selected samples. The inoculated samples are incubated for twenty-four hours and the microscopic selection is preferably repeated to further improve the quality of the bacteria. Operation of microscopic selection and incubation of the selected cultures is repeated until cultures of satisfactorily normal appearance showing a strong formation of culture are obtained. The same bacteria as repeatedly mentioned above cannot be prepared according to the method described by Weizmann (British Patent 4845/1915) for the spores of the butylobacter are very sensitive to heat, much more sensible in any case than the spores of other hitherto known species. Heating up to 100° C. as prescribed by Weizmann produces a rather unfavorable effect: generally the spores are killed and if they survive they show a retarded and decreased fermenting effect. Moreover it is necessary to select a carrier of bacteria fit for these purposes. Hitherto I have found four species of the butylobacter:

1. butylobacter zeae Bakonyi, prepared on Hungarian maize 1924,
2. butylobacter betae Bakonyi, prepared on beets (Beta vulgaris) Kreis Zerbst 1928,
3. butylobacter sinense Bakonyi, prepared on Jaffa oranges 1928,
4. butylobacter solani Bakonyi, prepared on German potatoes, Kreis Zerbst 1928.

But I have not succeeded in winning the butylobacter from German maize, because it can be found, as I presume, only on such fruits, as are gathered on a good humus soil or are in continual touch with the soil themselves (beets and potatoes).

The best method of preparation is the following:

On the bottom of a sterilized test tube of about 40 cm. in length, an aseptically taken sample from the (unsterile) raw material is transferred and covered with 20 cm. in height of a 5% sterile corn mesh containing about 1–2% of butanol, whereupon the evacuated test tubes are to be incubated at 37° C. for about 24 hours. In the test tubes an active fermentation sets in if butylobacter or other inciters of fermentation processes are present. The microscopical figures are with regard to the addition of butanol rather simple:

1. clumpy-short bacteria, different streptobacteria, butyric acid bacteria, but no haybacilli, no members of the macerans group,
2. fine little bacteria (butylobacter).
3. different cocci.

When the fine little bacteria already exist in majority, I may try at once to separate the different kinds according to the well known "agar plates method", otherwise the culture is transferred for 24 hours to a fresh butanol containing mash all those being removed which are less resistant against butanol. Upon plates butylobacter grows only anaerobically and can be separated without difficulty by the following morphological characteristics from the other species.

1. The vegetative cells are considerably shorter and slenderer than all the other hitherto known butanol acetone bacteria. The bacteria lying in pairs form an obtuse angle, resembling to *Myxobacterium tuberculosis*. They do not form chains and show the said rather characteristic gramcoloring (positive, then negative, then again positive).

2. The spores belong likewise to the smallest ever formed by butanol-acetone bacteria, they have the form of a cylinder, whilst the spores of the other kinds are oviform. Only the *Bacillus butylicus* Boinot-Firmin has spores of about the same size and form; however the butylobacter forms only one spore, *Bacillus butylicus* B. F. frequently two, butylobacter has rounded, B. F. unrounded cells, butylobacter forms neither chains nor filaments as B. F. and finally butylobacter is nearly by half shorter and slenderer than B. F. In the following table the characteristics of the best known species are assembled in order to facilitate the identification of the butylobacter.

|  | Bacillus Weizmann | Bacillus butyl. B. F. | Bacillus butylaceticum | Bac. acetobutylicum | Clostridium butyr. Pike-Smyth | Butylobacter |
|---|---|---|---|---|---|---|
| Author | Weizmann | Boinot | Freiberg | Horton | Pike-Smyth | Bakonyi. |
| Patent | Brit. Pat. 4845/1915. | U. S. Pat. 1,385,888. | U. S. Pat. 1,537,597. | U. S. Pat. 1,427,595. | U. S. Pat. 1,655,435. | |
| Cells (micron) | 3-3½ 0, 3-0, 6 | 3-5· 0, 4 | 3-4· 0, 4-0, 6 | 2-4·1-2 | 3-10· 0, 75-1 | 2-3· 0, 25-0, 3 |
| Spores (micron) | 2, 2·1, 2 | 1-1, 2·0, 5 | 2, 2·1, 2 | 1, 6·1, 2 | 2-2, 5·1 | 1·0, 5-0, 7 |
| Figure of cells | Rounded | Unrounded | Rounded | Rounded | Rounded | Rounded. |
| Formation of chains | Exist | Exist | Exist | Exist | Exist | None. |
| Figure of spores | Oval | Cylindr. | Oval | Oval | Oval | Cylindr. |
| Quantity of spores | 1 | 1-2 | 1 | 1 | 1 | 1. |
| Gramcoloring | Pos | Pos | Pos | Pos | Pos. then negative. | Pos. then neg.. then again pos. |

The method of producing butanol and acetone by fermentation may be carried out as follows: 10,000 kgs. corn meal (containing 6000 kg. starch) suspended in the threefold quantity of water are boiled for one to two hours under two atmospheres pressure, blown out in a fermentation vat and diluted up to about 80,000 liters. By cooling down the temperature is reduced to about 37° C. and the wort is now inoculated with a laboratory culture of with certain quantity of fermenting wort. In the latter case the fermentation takes place at once and is completed after 30-40 hours. The formed products (butanol and acetone) are separated by distillation. The yield is 2500-2700 kgs.

In the same manner all the other cereals, potatoes, molasses etc. may be used.

When using molasses as a raw material for the fermenting process a previous heating of the molasses soup for about half an hour up to 100° C. will permit a vigorous and satisfactory fermentation.

I claim:

1. The method of preparing bacteria of the "butylobacter" group which comprises covering an asceptically taken sample from raw material containing bacteria with 5% sterile corn mash containing from 1 to 2% of butanol, incubating the same at a temperature of about 37° C. for about twenty-four hours and separating the bacteria of the "butylobacter" group by the agar plates method.

2. The method of preparing bacteria of the butylobacter group which comprises subjecting raw material containing mixed bacteria to a sterile mash containing approximately 1 to 2% of butanol and incubating at a temperature approximately 37° C.

3. The method of producing butanol and acetone which comprises sterilizing and cooling to a suitable temperature a suitable carbohydrate, inoculating the same with inciters of fermentation consisting of bacteria of the "butylobacter" group produced and separated by covering an asceptically taken sample from raw material carrying bacteria with 5% sterile corn mash containing from 1 to 2% of butanol, incubating the same at a temperature approximating 37° C. for about twenty-four hours and separating the bacteria of the "butylobacter" group and fermenting the carbohydrate mash with said bacteria.

4. The method of producing butanol and acetone which comprises boiling a starchy material in water to prepare it for fermentation, cooling said starchy material and inoculating and fermenting the same with bacteria of the "butylobacter" group produced and separated by covering an asceptically taken sample from raw material containing bacteria with 5% sterile corn mash containing from 1 to 2% of butanol, incubating the same at a temperature approximating 37° C. for about twenty-four hours and separating the bacteria of the "butylobacter" group.

5. The method of producing butanol and acetone which comprises heating a saccharine raw material to prepare it for fermentation, inoculating and fermenting the same with bacteria of the "butylobacter" group produced and separated by covering an asceptically taken sample from raw material containing bacteria with sterile corn mash containing from 1 to 2% of butanol, incubating the same at a temperature approximately 37° C., for about twenty-four hours and separating the bacteria of the "butylobacter" group.

6. The method of producing butanol and acetone by fermentation of carbohydrates which comprises cooking the carbohydrate to gelatinize the same, cooling and inoculating the cooled carbohydrate with a mixture of bacteria of the "butylobacter" group and fermenting the carbohydrate.

7. The method of preparing bacteria of the "butylobacter" group which comprises covering an asceptically taken sample from raw material containing bacteria with 5% sterile corn mash containing from 1 to 2% of acetone, incubating the same at a temperature of about 37° C. for about twenty-four hours and separating the bacteria of the "butylobacter" group.

8. The method of preparing bacteria of the "butylobacter" group which comprises subjecting raw material containing mixed bacteria to a sterile mash containing approximately 1 to 2% of acetone and incubating at a temperature approximately 37° C.

9. The method of producing butanol and acetone by fermentation of carbohydrates which comprises sterilizing the carbohydrate, inoculating the same with bacteria of the butylobacter group prepared from raw material containing mixed bacteria by subjecting the same to a sterile mash containing small quantities of butanol and acetone and incubating the same at a suitable temperature, and fermenting the carbohydrate.

10. The method of producing butanol and acetone by fermentation of carbohydrates which comprises sterilizing the carbohydrate, inoculating the same with bacteria of the butylobacter group prepared from raw material containing mixed bacteria by subjecting the same to a sterile mash containing small quantities of butanol and incubating the same at a suitable temperature, and fermenting the carbohydrate.

11. The method of producing butanol and acetone by fermentation of carbohydrates which comprises sterilizing the carbohydrate, inoculating the same with bacteria of the butylobacter group prepared from raw material containing mixed bacteria by subjecting the same to a sterile mash containing small quantities of acetone and incubating the same at a suitable temperature, and fermenting the carbohydrate.

12. The method of producing butanol and acetone by fermentation of a suitable carbohydrate which comprises developing a culture of bacteria of the butylobacter group by subjecting raw material containing mixed bacteria to a nutritive mash containing a small quantity of butanol incubating the same at a suitable temperature, selecting the best developed bacteria and further incubating the selected bacteria in a nutritive mash containing a small quantity of butanol to develop a sub-culture and fermenting the carbohydrate with a sub-culture of the bacteria so produced.

13. The method of producing butanol and acetone by fermentation of a suitable carbohydrate which comprises developing a culture of bacteria of the butylobacter group by subjecting raw material containing mixed bacteria to a nutritive mash containing a small quantity of acetone incubating the same at a suitable temperature, selecting the best developed bacteria and further incubating the selected bacteria in a nutritive mash containing a small quantity of acetone to develop a sub-culture and fermenting the carbohydrate with a sub-culture of the bacteria so produced.

In testimony whereof I affix my signature.

STEFAN BAKONYI.